United States Patent [19]

Jones et al.

[11] Patent Number: 4,835,384

[45] Date of Patent: May 30, 1989

[54] DEVICE AND METHOD FOR DETERMINING DISPLACEMENT USING COLORED TRANSPARENT SPHERES

[75] Inventors: Gordon R. Jones; James L. Moruzzi, both of Heswall; Akkanapragada N. Prasad, West Kirby, all of England

[73] Assignee: The University of Liverpool, Liverpool, England

[21] Appl. No.: 903,656

[22] Filed: Sep. 5, 1986

[30] Foreign Application Priority Data

Sep. 6, 1985 [GB] United Kingdom ............... 8522202
Nov. 25, 1985 [GB] United Kingdom ............... 8528982

[51] Int. Cl.⁴ .............................................. G01J 3/50
[52] U.S. Cl. .................................... 250/226; 250/227; 250/231 R
[58] Field of Search ............... 250/226, 227, 231 SE, 250/231 R; 356/405, 406, 407

[56] References Cited

U.S. PATENT DOCUMENTS

| | | | |
|---|---|---|---|
| 4,247,202 | 1/1981 | Failes | 250/226 |
| 4,517,456 | 5/1985 | Halsall et al. | 250/226 |
| 4,543,961 | 10/1985 | Brown | 250/226 |
| 4,547,074 | 10/1985 | Hinoda et al. | 356/405 |

Primary Examiner—David C. Nelms
Assistant Examiner—Stephone B. Allen
Attorney, Agent, or Firm—John S. Hale

[57] ABSTRACT

An apparatus for determining displacement of an object, comprises a light source which propagates a polychromatic light signal along a path to a detector, the detector being capable of detecting the intensity of incident radiation at a plurality of different wavelengths, and a radiation modulation means mechanically coupled to said object for movement therewith, displacement of the object being arranged to cause displacement of the radiation modulating means in said path such as to vary the distributed spectral content of the light reaching the detector.

In one embodiment the radiation modulation means comprises a filter which attenuates the intensity of transmitted wavelengths to different degrees and which is mechanically coupled to said object such that movement of the object displaces the filter so as to vary the extent to which the filter intercepts the radiation signal propagated by said light source.

9 Claims, 12 Drawing Sheets

DEVICE AND METHOD FOR DETERMINING DISPLACEMENT USING COLORED TRANSPARENT SPHERES

The invention relates to a device and method for determining displacement of an object.

Displacement measuring systems are known which rely for their operation upon the absolute measurement of intensity of light at a single wavelength. Such systems, particularly those using fiber optics, are susceptible to ageing and loss of security due to minor faults.

It is also known to measure displacement using an optically resonant structure whose resonance characteristic changes as a function of said displacement. Such structures are, however, relatively complex and expensive to achieve.

It is an object of the present invention to provide an apparatus and method for determining displacement of an object in which the problems and deficiencies associated with known systems are reduced.

In accordance with a first aspect of the present invention, there is provided an apparatus for determining displacement of an object, comprising a light source which propagates a polychromatic light signal along a path to a detector, the detector being capable of detecting the intensity of incident radiation at a plurality of different wavelengths, and a radiation modulation means mechanically coupled to said object for movement therewith, displacement of the object being arranged to cause displacement of the radiation modulating means in said path such as to vary the distributed spectral content of the light reaching the detector.

The term "polychromatic light" as used herein and in the appended claims is intended to encompass multiwavelength electromagnetic radiation which includes either visible or non-visible electromagnetic radiation, or both.

The polychromatic light source can produce, for example, a white light signal; displacement of the object results in 'color modulation' of the white light signal by the radiation modulation means, the spectral content of this 'color modulation' then being analyzed to determine the displacement of the object which caused same.

In some embodiments, "colour resolution" upstream of the detector can be achieved by conventional means, such as a prism or diffraction grating; the actual detection can then be achieved by conventional devices, such as a charge-coupled array or by sweeping across a photosensitive element. The electrical output of the detector may be processed, if necessary, by microprocessor technology.

The simplest form of signal analysis is by monitoring the ratio of intensities at two separate wavelengths of the light. In another possibility, the actual colour of the light reaching the detector may be quantified. More complicated analysis, involving pattern recognition procedures using a central microprocessor unit may be involved for multiparameter or multiprecision measurements.

Transmission of the light from the source to the radiation modulating means and from the radiation modulating means to the detector is preferably by two optical fibres, which are separated longitudinally by a gap, the radiation modulation means being movable in the latter gap.

In the simplest case, the radiation modulation means may comprise a filter strip which attenuates the intensity of transmitted wavelengths to different degrees. Movement of the object is arranged to displace the filter so as to vary the extent to which the filter intercepts the light signal propagated by the light source.

The filter is preferably constructed so as to be capable of withstanding hostile environments, such as high temperatures and/or corrosive substances.

One example of such a filter comprises glass coated with a high-temperature ceramic glaze as the optically active medium. Such devices are easily manufactured without specialist equipment, can be readily arranged to have a desired variety of spectral properties, are inexpensive and not susceptible to ageing (as compared to precision filters used conventionally for scientific purposes which have well defined bandwidths, are delicate and expensive) and thereby change the spectral content of the white light, i.e. attenuates certain wavelengths more than others. By measuring the spectral content, the displacement of the filter relative to the optical fibres carrying the light signal (and hence the corresponding displacement of the object) can be determined by calibration. Since some wavelengths (normally in the infrared) are not affected by the filter, the light at these wavelengths may be used to address the condition of the system.

Coarse and fine resolution of displacement can be achieved by suitable choice of wavelengths which are monitored.

By using two filters moving orthogonally and with different spectral responses, two parameters of displacement can be monitored simultaneously with the same detection system and without additional optical fibres. This can be used as a means of achieving temperature compensation of a displacement transducer, by use of suitable software control.

Although the use of a filter providing "broad band filter modulation" is adequate for many applications, there exists an insensitive range at the beginning of the travel of the filter in the gap between the optical fibers. There are also other applications, such as extended length scales, where the lack of sensitivity over part of the displacement range would be unacceptable.

To overcome these problems, the simple filter strip may be replaced by a colored, transparent sphere. This serves the dual purpose of modulating the spectral content of the light (as in the case of the filter strip) and also simultaneously providing a focussing action. This focussing action can be arranged to increase the intensity of the wavelengths transmitted by the sphere whilst reducing the intensity of the filtered wavelengths. This can lead to a more linear variation of relative intensity with displacement, thereby increasing the range without prejudice to the sensitivity.

A plurality of such coloured spheres may be used to determine displacement in a plurality of directions or may be used to determine displacement over a distance which is larger than the size of a single sphere.

One example of such coloured spheres are so-called "ruby spheres". These are readily available, accurately dimensioned and inexpensive.

By way of example only, specific embodiments of the present invention will now be described, with reference to the accompanying drawings, in which.

Figure 22:
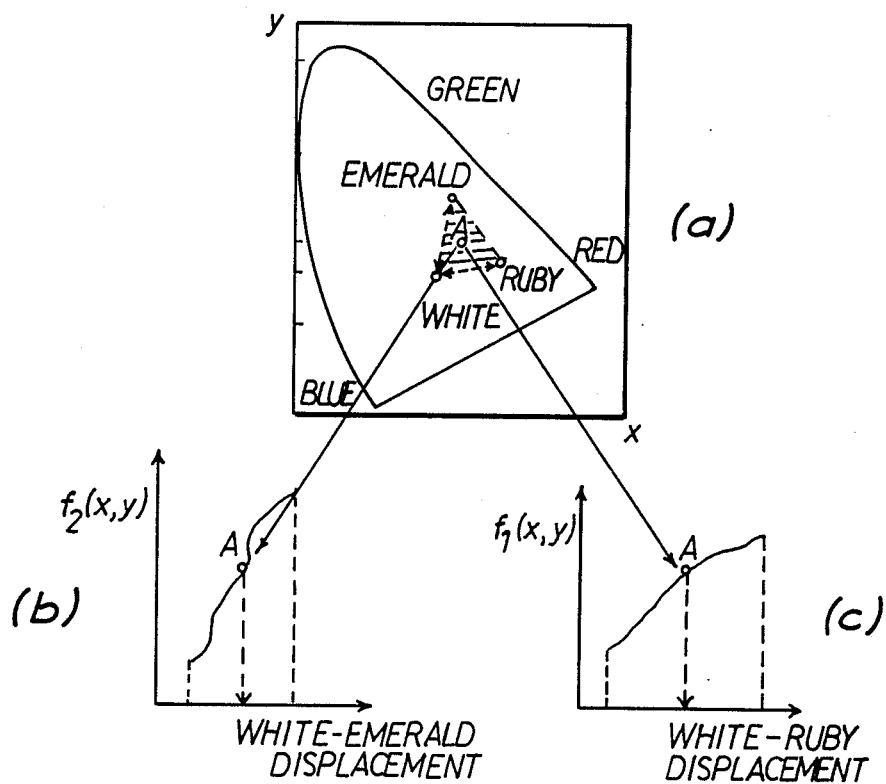
Figure 23:
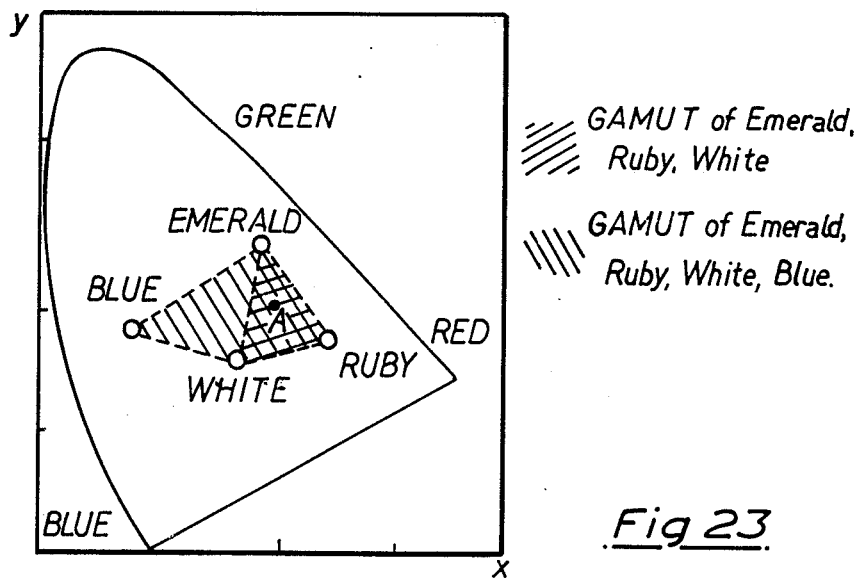
Figure 24:
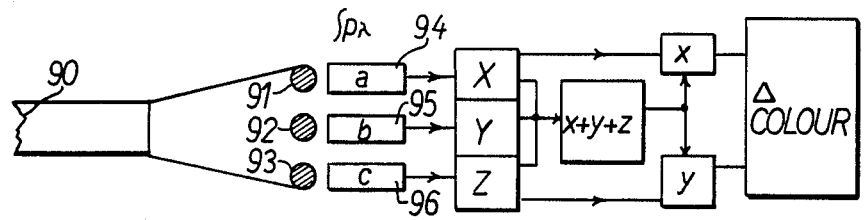
Figure 25:
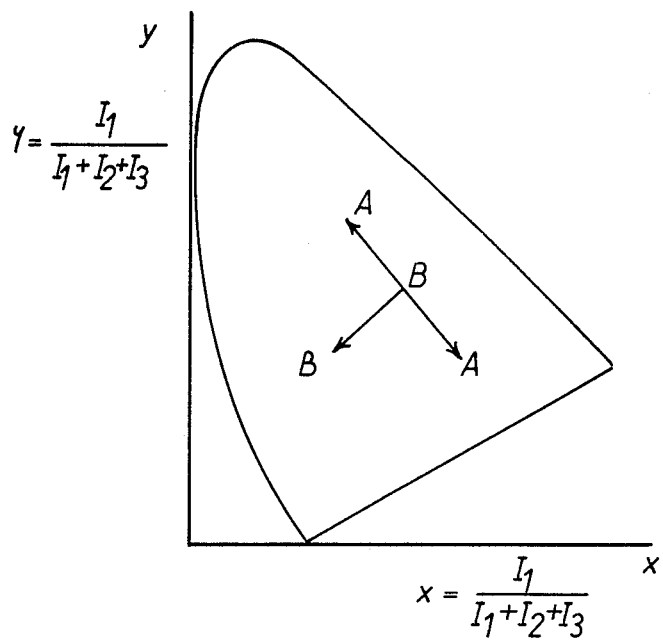
Figure 29:
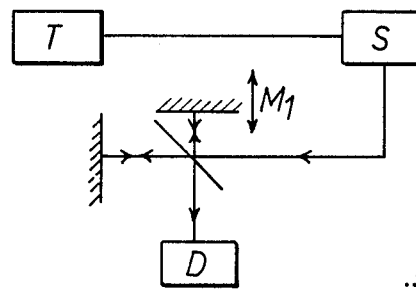
Figure 26:
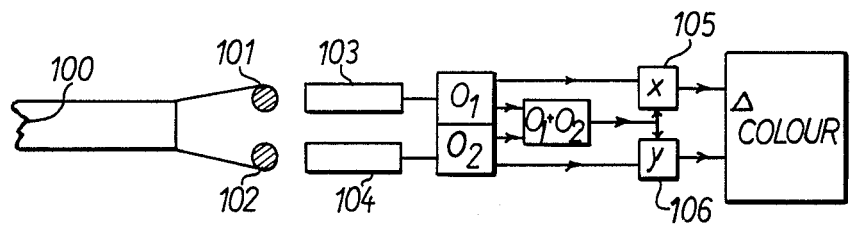
Figure 27:
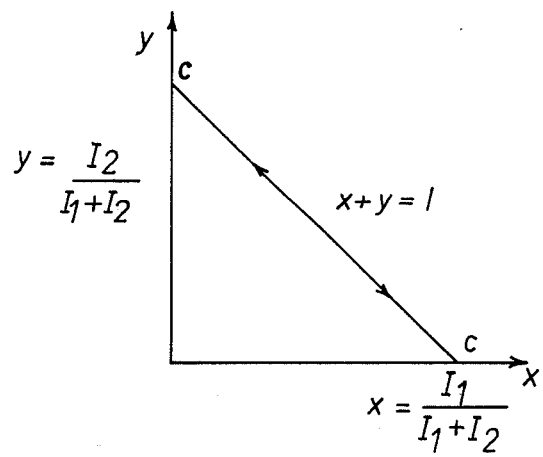
Figure 28:
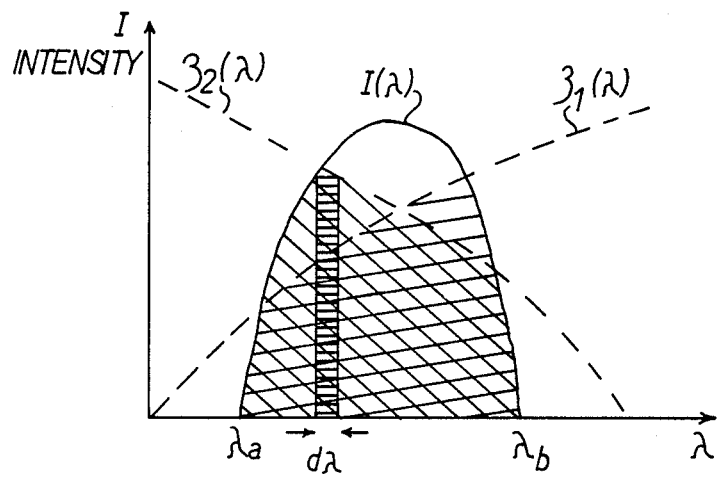

FIG. 22 illutrates the measurement of two displacements on the Chromaticity Diagram;

FIG. 23 illustrates how a fourth colour can be accommodated on the Chromaticity Diagram;

FIG. 24 illustrates the construction of one embodiment of a colour detector for use in a system in accordance with this invention;

FIG. 25 is a simplified version of the Chromaticity Diagram;

FIG. 26 illustrates the construction of a second embodiment of a colour detector for use in the invention;

FIGS. 27 and 28 are diagrams for use in explaining the operation of the colour detector of FIG. 26; and FIG. 29 is an illustration of a further embodiment of a colour detector for use in a system in accordance with this invention.

Figure 1:
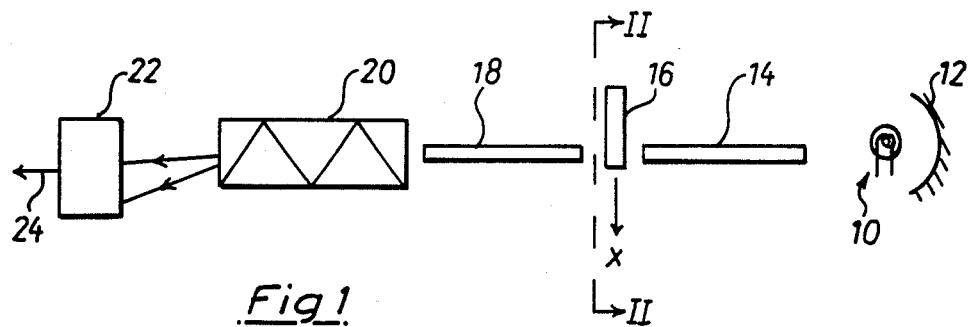
FIG. 1 is a diagrammatic view of an arrangement according to a first embodiment of the invention.

Referring firstly to FIG. 1, there is illustrated diagrammatically a broad-band electromagnetic radiation source 10 and a concave mirror 12 which combine to project polychromatic light (which could include visible and/or non-visible radiation) down one end of a first optical fiber 14. Adjacent to the other end of the first optical fiber 14 is a radiation modulating element in the form of a blue filter 16. The filter is of low optical quality and is coloured with a ceramic glaze so that it will be cheap, long-lasting and capable of withstanding corrosive and hot environments. The filter is attached to a body (not shown) whose displacement is to be measured, as will be explained later.

After passing through the filter, the light enters a second optical fiber 18 and thence to a refraction device 20, comprising a plurality of prisms, which splits the light into its components. The intensity of each component is measured by means of a conventional detector 22, such as a charge coupled device array, connected to a microprocessor (not illustrated) by cable 24, the microprocessor performing the calculations of intensity of received light at different wavelengths.

Figure 2A:
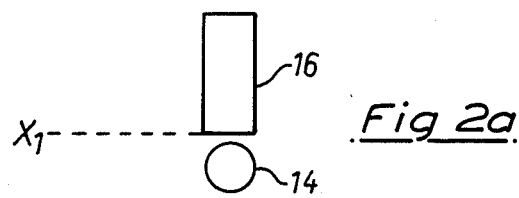
FIGS. 2a, 2b, 2c, 2d, 2e are views in the direction of arrows II—II in FIG. 1.
Figure 2B:
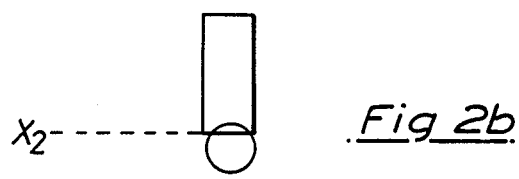
Figure 2C:
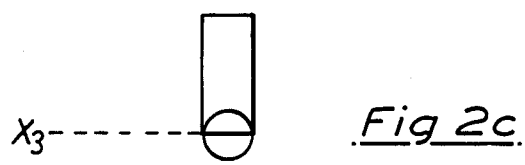
Figure 2D:
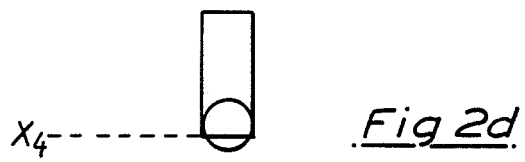
Figure 2E:
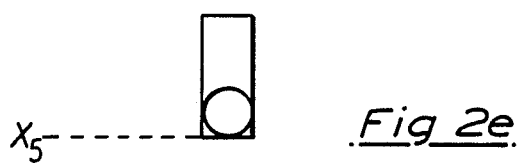

The blue filter 16 is moved as the body to which it is attached moves, as shown diagrammatically in FIGS. 2a to 2e. In FIG. 2a the filter does not cross the path of light passing between the optical fibres 14, 18. In FIGS. 2b, 2c and 2d, the filter partially crosses the light path by varying amounts, and in FIG. 2e, all the light passing between the optical fibres 14, 18 passes through the filter 16.

Figure 3:
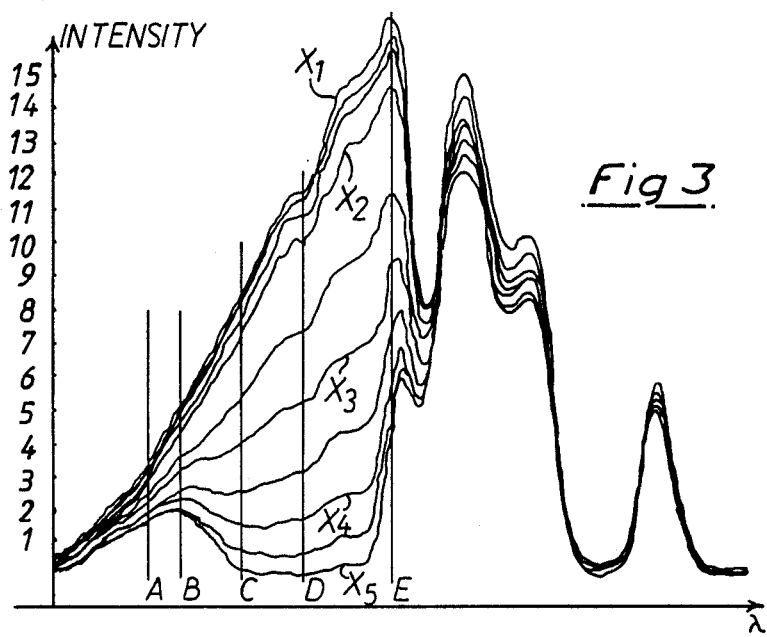
FIG. 3 is a plot of intensity against wavelengths for various displacements of a filter shown in FIGS. 1 and 2.

The plots of the intensity (I) of the transmitted light against the wavelength ($\lambda$) of the light are shown in FIG. 3, for various displacements X of the filter. The positions are shown as $X_1$ to $X_5$, corresponding to FIGS. 2a to 2e, $X_1$ corresponding to the displacement of the filter 16 in FIG. 2a and $X_5$ corresponding to the displacement of the filter 16 in FIG. 2e. From this curve, and using known displacements, a calibration curve may be constructed. Four such curves are shown in FIG. 4.

Figure 4:
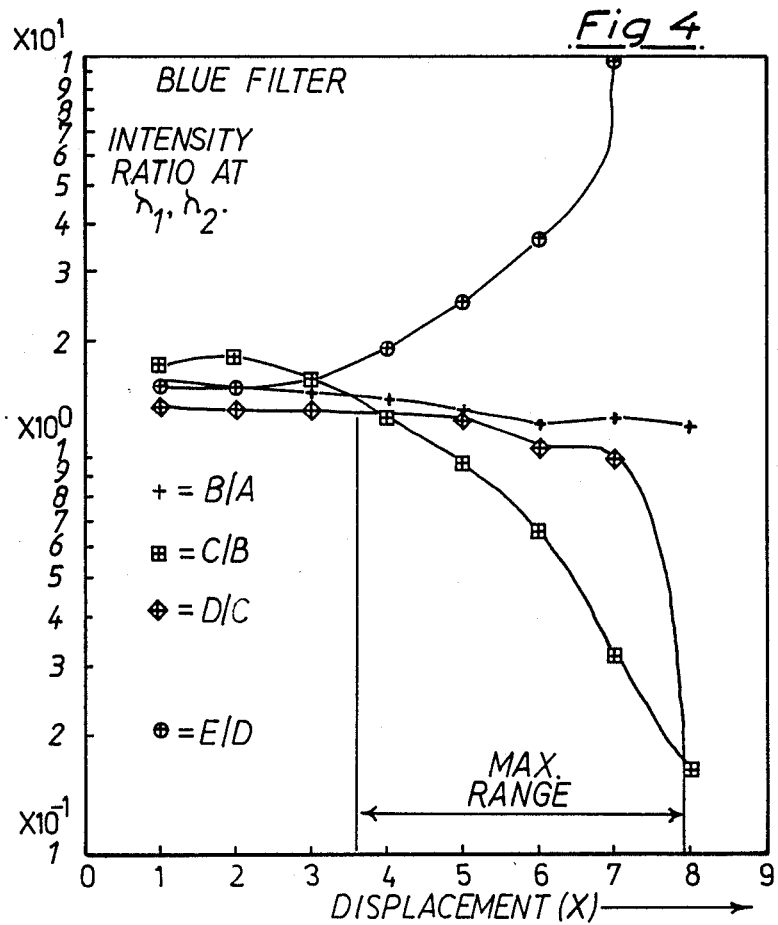
FIG. 4 is a plot of ratios of intensity against displacement, obtained from FIG. 3.

FIG. 4 shows the plots of the ratio of the intensities of two wavelengths against displacement. The two wavelengths selected are identified by B/A, C/B, D/C and E/D where B/A refers to the ratio of the intensities at wavelengths B and A respectively, and so on with C/B, D/C and E/D. The wavelengths A to E are identified in FIG. 3. Thus, once the calibration of the intensities has been performed, then in order to calculate displacement of the filter 16, it is only necessary to measure the intensities of the emitted light at two different wavelengths, the displacement being obtained by calculating their ratio and comparing it with the calibrated value.

The approximate operating range is shown in FIG. 4. It will be appreciated that the selection of different wavelengths will give rise to different sensitives of the device. For example, using wavelengths C and B, the device gives a relatively coarse sensitivity, whereas in the range of 7 to 8 on the displacement axis, the wavelengths D and C give a fine sensitivity.

Referring still to FIG. 4, the ratio C/B can thus be used as a coarse sensitivity determination; the portion of the D/C curve approaching the vertical can be used for fine sensitivity determination; the substantially horizontal B/A ratio can be used as a "system condition" monitor; and the ratio E/D can be used as crosscheck signal.

It will be appreciated that instead of constructing a calibration curve, the calibration measurements may be fed into a microprocessor or computer which can then calculate subsequent displacements of the filter by comparing the intensity signals received at the wavelengths at which calibration took place. It will also be appreciated that different wavelengths may be employed for measuring over different ranges of displacement.

Figure 5:
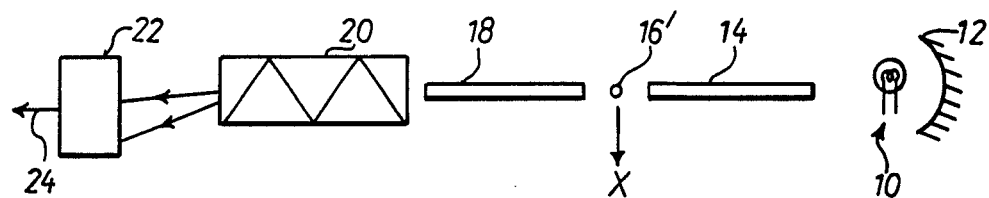
FIG. 5 is a diagrammatic view of an arrangement according to a second embodiment of the invention.

A second embodiment of the invention is illustrated diagrammatically in FIG. 5. The apparatus differs from that shown in FIG. 1 in that the blue filter 16 forming the modulating element is replaced by a ruby sphere 16'. It is used in a similar way to the first embodiment, in that modulation is caused by preferential absorbtion within certain wavelength ranges, the device being calibrated for various wavelengths using known displacements. The intensity is plotted against wavelength for various known values of the displacement (shown in FIG. 6) and from these curves, calibration curves (FIG. 7) of the ratio of intensities of two wavelengths against displacement are drawn.

Figure 7:
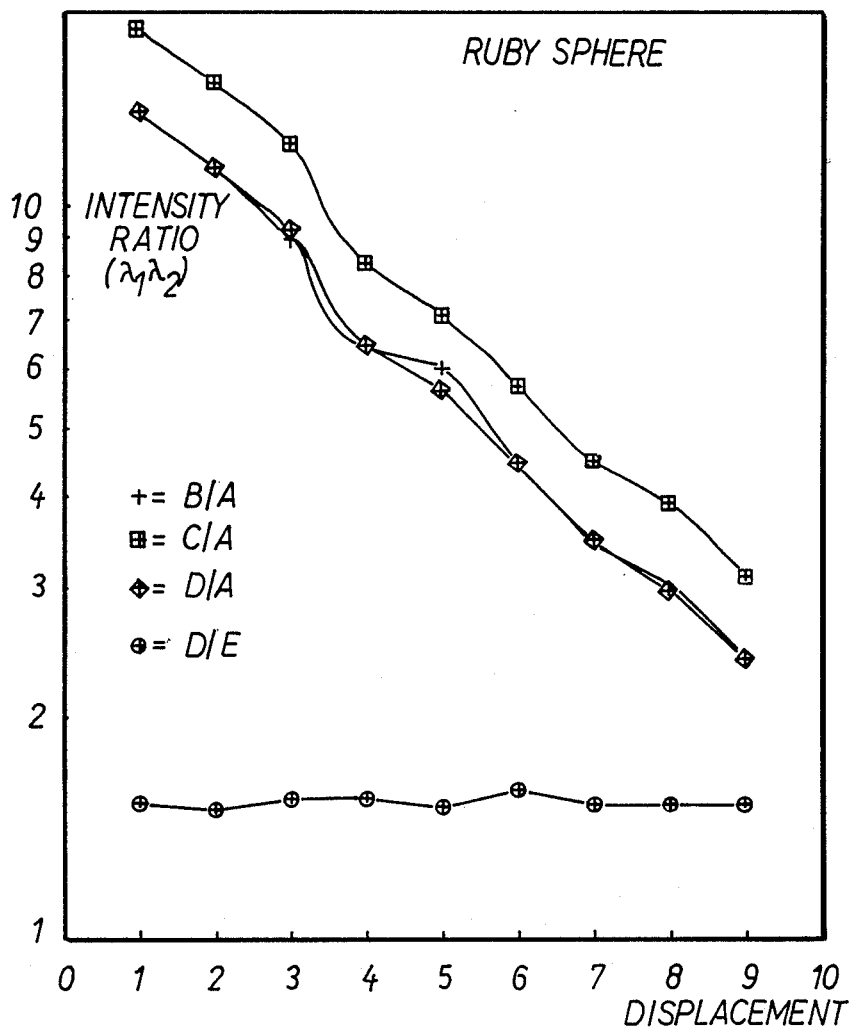
FIG. 7 is a plot of ratios of intensity against displacement, obtained from FIG. 6.

As in the first embodiment, the reference wavelengths are A, B, C, D, E (not necessarily the same as the first embodiment), and in FIG. 7, the references to B/A, C/A and D/A and D/E have the same meaning as in the first embodiment.

Figure 6:
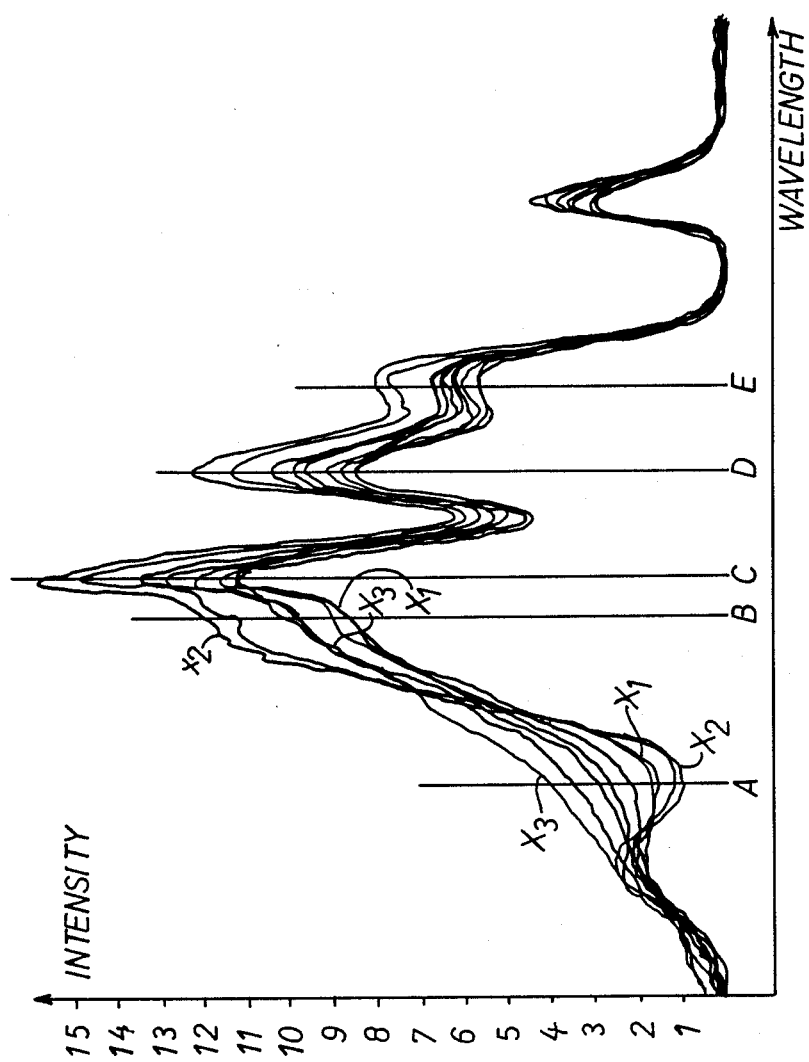
FIG. 6 is a plot of intensity against wavelength for various displacements of a filter shown in FIG. 5.

It will be seen from FIG. 6 that the filtering function of the sphere causes a reduction in the intensity at wavelength A and the focussing function of the sphere causes an increase in the intensity at wavelength B. These two factors combine to make the ratio $I_A/I_B$ (where I is the intensity) vary more linearly with displacement, and the results of this can be seen in FIG. 7, where the ratios B/A, C/A and D/A are all much more linear than was the case with the curves of FIG. 4. Ratio D/E again provides a "system condition monitor" signal.

As in the first embodiment, calibration curves need not actually be constructed, but instead the information from the calibration may be fed into a microprocessor or microcomputer, from which calculations of displacement may be obtained by obtaining the ratio of the intensities of two different wavelengths.

It may be preferred to use two or three differently colored spheres to provide the possibility of monitoring two or three displacements simultaneously. Since it is only the ratio of intensities that is required, and not the values of the intensities per se, it will be seen that this is possible.

Figure 8:
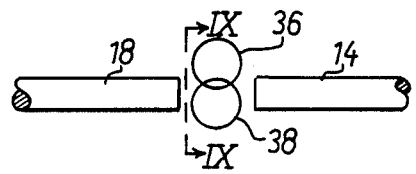
FIG. 8 is a diagrammatic view of a modulating arrangement according to a third embodiment of the invention.
Figure 9:
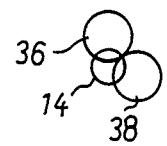
FIG. 9 is a view in the direction of arrows IX—IX in FIG. 8.

A third embodiment of the invention is illustrated in FIGS. 8 and 9. The apparatus is identical to that used in FIG. 5, except that two differently coloured spheres 36, 38 which are in contact with each other are used. Since the two spheres have different spectral properties, the displacement of the spheres in two directions may be ascertained by detecting the intensities of various wavelengths, computing the relevant ratios and comparing the values obtained with the calibrations for each sphere. It is preferred to detect the wavelengths which each sphere transmits and which the other sphere does not, since the measurements will then not need correction for the amount of radiation transmitted by the other sphere.

As before, the measurement of the intensities, the calculation of the ratios and the calculation of the displacements in the two directions may be performed by a microprocessor or a computer. The calibrations of each sphere may also be performed with a computer, as before.

If it is wished to detect movement in three or more directions, the same number of spheres as directions is used. For example, if three directions are required, three spheres with different spectral properties are used.

Figure 11:
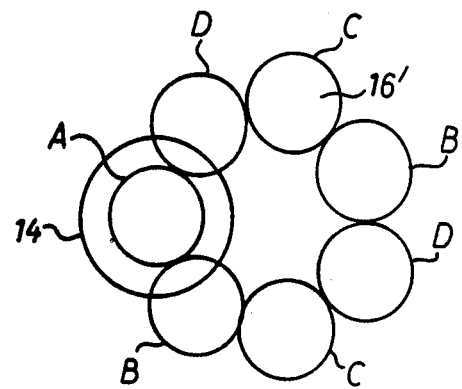

A variation of the above is illustrated in FIG. 11. The apparatus used is substantially identical to that of FIG. 5, except that the sphere 16' has been replaced with seven spheres 16', arranged in a circle on an object which rotates about an axis running through the centre of the circle. There are four different types of sphere, labelled A, B, C and D, each of which has been calibrated for various angular displacements, with respect to ratios of intensities. Due to the different spectral properties of the spheres and the order in which they are arranged with respect to each other, it is possible to determine both the angular displacement and the sense of rotation of the object.

Figure 10:
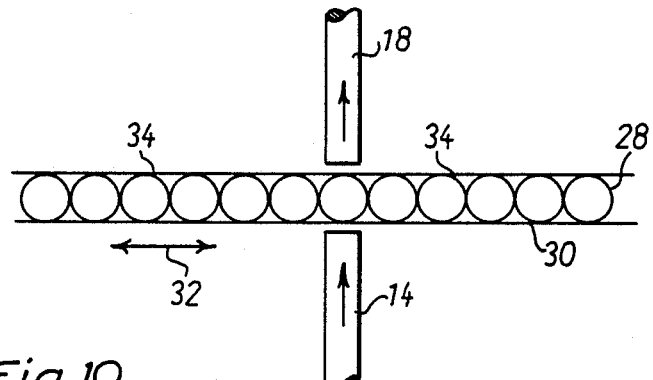
FIGS. 10, 11 and 12 are diagrammatic views of modulating arrangements according to fourth, fifth and sixth embodiments of the invention respectively.

A fourth embodiment of the invention is illustrated in FIG. 10. The apparatus is generally similar to that shown in FIG. 5, except that the ruby sphere is replaced by a plurality of ruby spheres 28 held in a straight line by inserting them fixedly in a straight groove 30 on a scale. Also illustrated in FIG. 10 is the first optical fiber 14 and the second optical fiber 18.

In use, the scale is movable in the direction indicated by the arrow 32, i.e. along the axis of the groove 30. The radiation source and the ruby spheres are identical to those used in the embodiment of FIG. 5, and so the calibration obtained from that embodiment will be used for discussion hereinafter. Movement of the spheres in the direction of arrow 32 causes the intensity, and hence the intensity ratios, of the wavelengths detected to vary, and using the calibration obtained for one of the ruby spheres (see FIG. 7) the movement and direction of movement can be calculated, for example by a microprocessor or a computer.

With the arrangement illustrated, it is possible to have a long range scale (of the order of meters) which is also very accurate (to better than 20 microns). This may be done by measuring coarse movement of the scale using a suitable intensity ratio and using a different intensity ratio to measure very small displacements, e.g. on the last sphere corresponding to the end of the displacement path. For example, referring to FIG. 7, it will be appreciated that the intensity ratio/displacement curves for each sphere will be symmetrical so that the passage of each sphere can be detected and counted to build up a calculation of the overall displacement. Accurate (fine sensitivity) measurement need only be made on the last sphere.

Another advantage of the ruby sphere scale is that displacement and direction of movement can both be measured using only a single light source and two optical fibres.

An alternative way of measuring coarse displacement is to have differently coloured spheres 34, which allow transmission of a different wavelength not transmitted by ruby spheres, substituted for the ruby spheres at regular intervals along the groove. Detection of the different wavelength would indicate the number of differently colored spheres which had passed, and since the spheres are of a precise diameter, a rough estimate of the displacement would be possible. Once the coarse measurement has occurred, the fine measurement can take place as previously described. Note that the differently coloured spheres 34 will also need to be calibrated so that the ratios of intensities of a plurality of wavelengths may be used to measure small distances.

The above measurements can be performed automatically, with the aid of the microprocessor. The microprocessor can be used to count the number of differently colored balls which have been detected, and calculate the displacement involved. The coarse displacement may then be stored, then corrected using the fine displacement measurement using the ratio of intensities as before.

Figure 12:
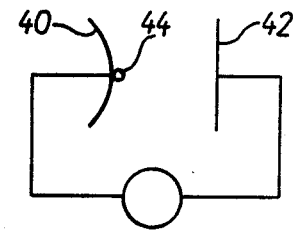

An application of the invention is illustrated diagrammatically in FIG. 12, in which a voltage measuring device is shown. This comprises a semimetallised diaphragm 40 and a conducting plate 42, separated from each other. When a potential difference is applied across the diaphragm and the conducting plate, the diaphragm is deformed towards the plate 42. A ruby sphere 44 attached to the diaphragm moves with it, and using the apparatus of FIG. 5 (not illustrated), the displacement of the diaphragm can be obtained. Since the displacement is proportional to the voltage applied, the voltage can be obtained by calibration.

Figure 13:
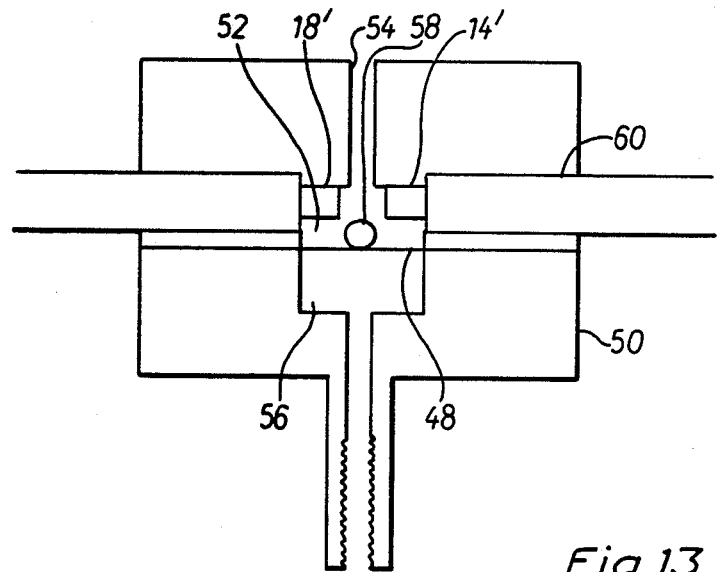
FIG. 13 is a diagrammatic cross-section of a modulating sensor arrangement according to a seventh embodiment of the invention.

A further application is illustrated in FIG. 13, in the form of a pressure transducer. A rubber diaphragm 48 divides the casing 50 of the transducer into a reference pressure section 52, open to a reference pressure by way of vent 54, and a pressure section 56, into which is introduced the fluid whose pressure is to be measured. A ruby sphere 58 is secured to the diaphragm and is movable between an inlet optical fiber 14' and an outlet optical fiber 18', each fiber being housed in a protective sleeve 60. The rest of the apparatus is identical to that of FIG. 5.

As the pressure in the section 56 changes, the diaphragm and ruby sphere move. By measuring the ratio of intensities of different wavelengths, the displacement of the ruby sphere, and by calibration the pressure to be measured, are obtained.

In further embodiments, the radiation modulating means may be a cylindrical element, such as an optical fiber. Like the ruby sphere described above, the curvature of a cylindrical element offers a focussing action to increase the linearity and/or sensitivity of the device.

A particularly effective form of modulating element is in the form of a transparent cylindrical element 62 which contains a colored pigment, the density/thickness of which changes along the length of the element. In one version (see FIG. 14), the transition between the colored filter region 64 and the transparent region 66 occurs at a sharply defined, oblique edge 68. In another version (see FIG. 15) there is no transition edge, the filter pigment diffusely decreasing in density to zero between a colored end 69a and a transparent end 69b.

It should be noted that cylindrical modulation elements can be used either in a transverse mode where the action is similar to that of a spherical element or alternatively, a longitudinal mode where movement is parallel to the cylinder length and using a gradation technique (as in FIG. 14 or FIG. 15) to increase the range but retain the focussing effect.

Figure 16:
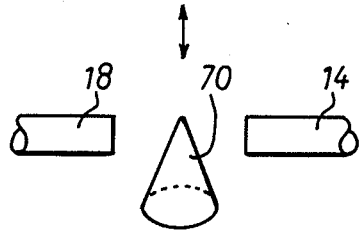

FIG. 16 shows a further modification of the apparatus of FIGS. 1 and 5 wherein the planar, or spherical modulating element is replaced by a modulating element 70 of conical configuration. The use of a cone provides a variation in the thickness of the filter material depending on position. As before, the curvature can be used to provide a focussing effect.

Figure 14:
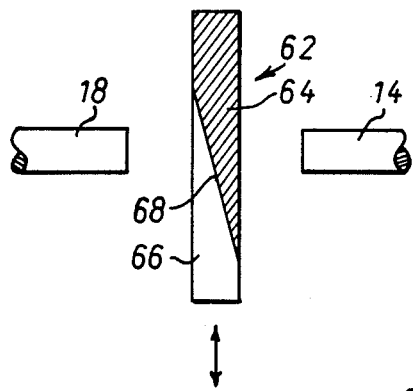
FIGS. 14 to 17 are diagrammatic views illustrating further embodiments of modulating sensors.
Figure 15:
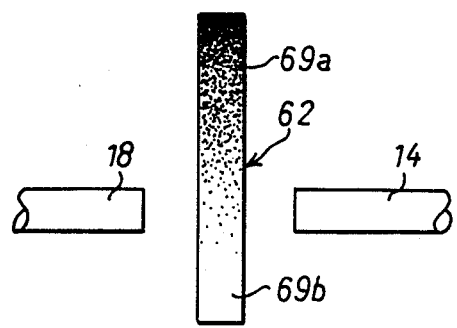
Figure 17:
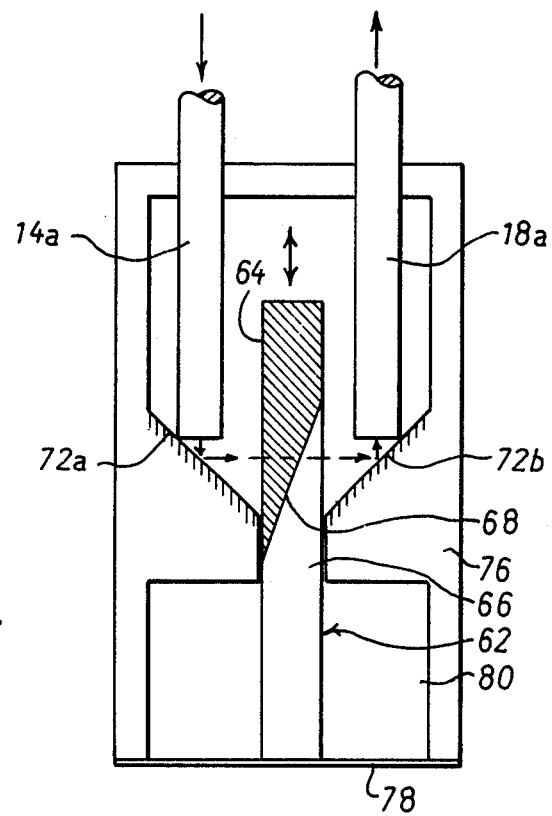

FIG. 17 shows a practical embodiment of a miniature pressure sensor using the modulating element of FIG. 14. In this embodiment the polychromatic light beam does not pass directly between the ends of the fibre guides 14a, 18a, but is bent through 180° by the use of two inclined mirrors 72a, 72b so that the light beams can enter and leave from the same end of the device. The cylindrical modulating element 62, having the coloured and transparent regions 64, 66 separated by the oblique interface 68, is slidably received in a cylindrical guide aperture 74 in a body member 76 so as to intersect the light beam reflected between the inclined mirrors 72a, 72b. The opposite end of the modulating element is attached to a diaphragm 78 extending across an internal recess 80 of the body 76 and which is subject in use to the pressure to be measured. The corresponding displacement of the modulating element 62 is measured by the detecting system to provide a measure of the pressure.

It is preferred in the latter embodiment for the unit shown in FIG. 17 to be sealed under vacuum to prevent contamination of the optical gap.

Returning now to the detector part of the apparatus, the detection technique described above in connection with FIGS. 3 and 4 and FIGS. 6 and 7 is based on the comparison of incident radiation at two predetermined wavelengths. The invention is not restricted to the detection being achieved by reference to two wavelengths only and there now follows an explanation and description of an alternative detection technique wherein the actual color or the dominant color, of the light signal received from the modulator is quantified whereby, in effect, the incident radiation at a plurality of different wavelengths is used.

In order to assist in an understanding of the concept of the detector embodiments described hereinafter, it is advantageous first to review the conventional concepts and theories regarding color measurement.

Figure 18:
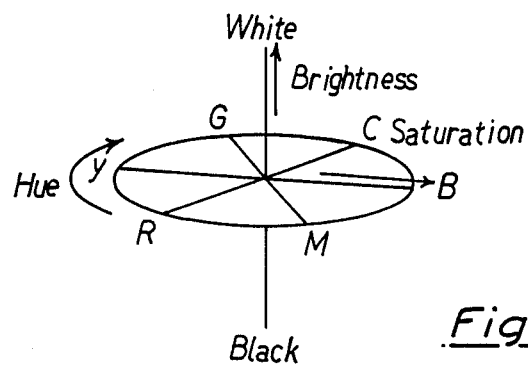
FIG. 18 is a conventional three-dimensional colour-space diagram.

FIG. 18 shows a conventional three dimensional color-space diagram in which saturation is represented radially, hue is represented circumferentially and brightness axially. The technique described hereinafter is concerned principally with measuring hue and saturation which can be described approximately by the Spectral Power Distribution (Pλ).

Figure 19:
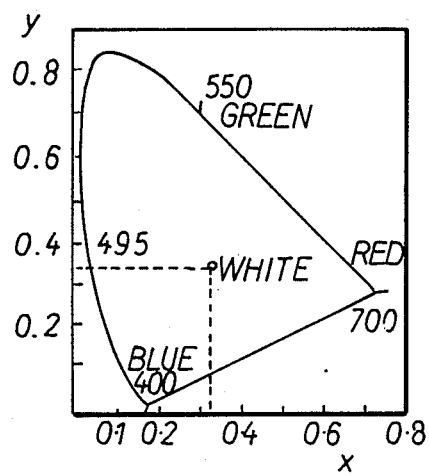
FIG. 19 is the so-called C.I.E. Chromaticity Diagram.

A quantitative definition of a color is achieved conventionally with a Chromaticity Diagram, the universally accepted diagram being the so-called C.I.E. diagram (Commission Internationale d'Eclairage) reproduced in FIG. 19. In this diagram, pure spectral colors lie on a horse-shoe shaped closed curve in x:y space defined by the Chromaticity Co-ordinates as defined below and various degrees of saturation or predominance of a particular wavelength are determined by position within this boundary. White color corresponds to the point with co-ordinates (0.33, 0.33). Thus, by use of this diagram, any particular color may be identified by a single point in two-dimensional space.

The chromaticity co-ordinates (x, y) are defined as follows:

$$x = \frac{X}{(X + Y + Z)} \quad \text{equation (1)}$$

$$y = \frac{Y}{(X + Y + Z)} \quad \text{equation (2)}$$

where $$X = \int_\lambda P\lambda \bar{x}\lambda d\lambda$$

$$Y = \int_\lambda P\lambda \bar{y}\lambda d\lambda$$

$$Z = \int_\lambda P\lambda \bar{z}\lambda d\lambda$$

Pλ=power in the spectral power distribution at wavelength λ and $\bar{x}\lambda$, $\bar{y}\lambda$, $\bar{z}\lambda$ are color matching functions, i.e. three different wavelength functions corresponding to the separate response of three distinct receptors.

Figure 20:
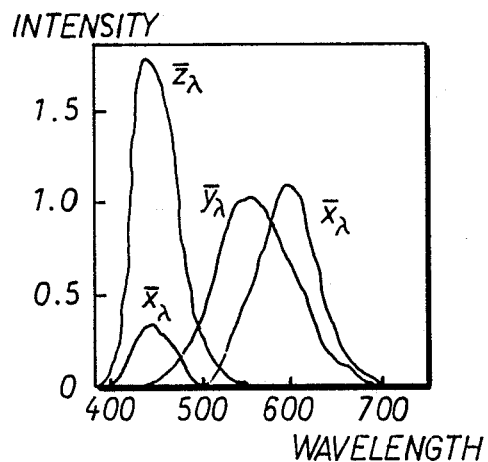
FIG. 20 shows the response characteristics of three receptor elements providing the functions $\bar{x}\lambda$, $\bar{y}\lambda$, and $\bar{z}\lambda$.

Reference is now made to the accompanying FIG. 20 which shows the required response characteristics of the three receptors which provide the functions $\bar{x}\lambda$, $\bar{y}\lambda$, $\bar{z}\lambda$. The relative juxtaposition of each of the color matching functions will be noted. These color matching functions can be stored digitally for micro-processor-aided analysis, a data bank of suitable colors for providing such color matching functions having already been established.

Thus, the conventional technique for identifying the color of any particular "impure" color involves sampling that color by means of the three receptors having the response characteristics of FIG. 20 and then using the resultant values of $\bar{x}\lambda$, $\bar{y}\lambda$ and $\bar{z}\lambda$ to calculate the values of x and y on the Chromaticity Diagram corresponding to that colour.

Figure 21:
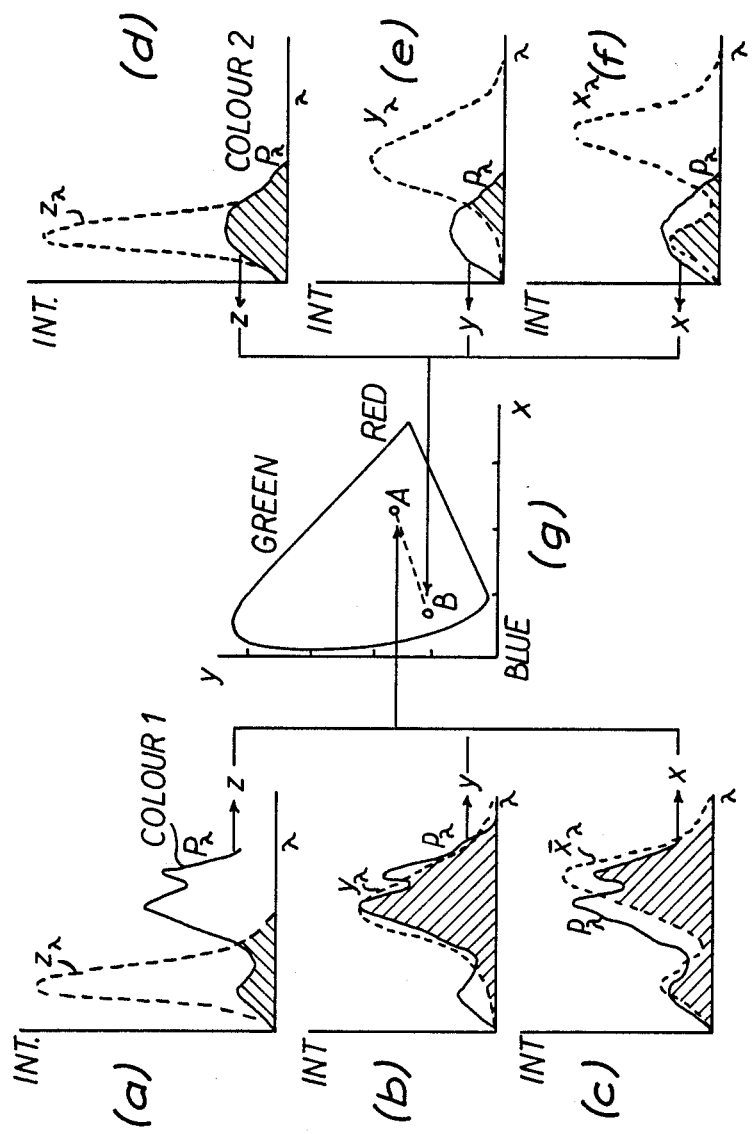
FIG. 21 illustrates how colour change is represented conventionally on the Chromaticity Diagram of FIG. 19.

The accompanying FIG. 21 shows how a colour change is represented on the Chromaticity Diagram. The three plots on the left-hand side in this diagram (FIGS. 21a, 21b and 21c) show the responses of the $\bar{z}$ receptor (upper), $\bar{y}$ receptor (middle) and $\bar{x}$ receptor (lower) to a first color and the plots on the right-hand side (FIGS. 21d, 21e and 21f) show the responses of the three receptors to a second color. The first color has an intensity/wavelength characteristic indicated by the solid line in FIGS. 21a, 21b and 21c. The response curves $\bar{z}\lambda$, $\bar{y}\lambda$ and $\bar{x}\lambda$ are indicated by chain lines in each case. The value of $z(=\int \lambda P\lambda \bar{z}\lambda d\lambda)$ is given by the area of overlap of the solid curve with the chain line curve in FIG. 21a. Likewise the values of $y(=\int \lambda P\lambda \bar{y}\lambda d\lambda)$ and $x(=\int \lambda P\lambda \bar{x}\lambda d\lambda)$ are given by the areas of overlap of the solid curves and chain line curves in FIGS. 21b and 21c. The values of x and y can then be calculated using equations (1) and (2) so as to arrive at point A in the Chromaticity Diagram of FIG. 21g.

The second colour is represented in FIGS. 21d, 21e and 21f by a solid line and the response curves $\bar{z}\lambda$, $\bar{y}\lambda$ and $\bar{x}\lambda$ by chain lines. The corresponding values of x and y can again be calculated using equations (1) and (2) to identify point B on the Chromaticity Diagram of FIG. 21g.

Changing the color, by adding or subtracting power to certain parts of the spectrum thus results in a change on the Chromaticity Diagram along the straight line A-B. When the change in color is brought about as a result of the relevant displacement of two components, such as the introduction of a colored filter into a beam of white light as described above in connection with FIG. 1 or FIG. 5 the color change along the straight line A-B can be related to said relative displacement to provide a measure thereof.

Measurement of two displacements, corresponding to two different parameters, may also be accomplished using the aforegoing technique, as illustrated in the accompanying FIG. 22. In this arrangement, a "white" light source is used to represent zero displacement. "Emerald" and "Ruby" represent first and second separate displacement extremes for monitoring the first and second parameters. If the "emerald" displacement is zero, then the "ruby" displacement is a simple, linearly related indication of true parameter 2 condition. If, however, both parameters 1 and 2 are non-zero then the observed colour might be A(co-ordinates $x_A$, $y_A$) from which, by stored calibration data, the values of parameters 1 and 2 may be uniquely determined.

The aforegoing technique can also be applied to a system having a plurality of color sources. As illustrated in the accompanying FIG. 23, the introduction of a fourth colour source (e.g. blue) increases the gamut into a new zone and so leads to the possibility of detecting additional parameters simultaneously with the same measuring system. However, the point A is no longer uniquely determined since it may, for instance, be accessed with or without blue.

In order to overcome this ambiguity, it is necessary to depart from the normal color vision representation in terms of only the two parameters (x, y) and to incorporate also the z parameter. This will enable the ambiguity regarding A to be resolved.

The aforegoing discussion outlines the theory by which a determination of "color" can be made and a corresponding numerical representation established. Several practical means of implementing a color detector for achieving a measurement of "color" in compliance with the aforegoing theory are now described.

Referring first to FIG. 24, there is shown a color detector wherein light arrives at the detector by way of an optical fiber 90, leading from, for example, a light modulating device of the type described and illustrated in any of FIGS. 1, 5, 8 or 9 to 17 of this Application. The incoming light from the fiber 90 is applied to three colored spheres 91, 92, 93, each of which is located in front of a respective light detector 94, 95, 96, for example photo-sensitive diodes. The colored spheres each have different color transmission characteristics which, combined with the responses of the detectors 94, 95 and 96 are arranged to provide three resultant color matching functions, X, Y and Z corresponding respectively to $$X = \int P\lambda x\lambda d\lambda$$
$$Y = \int P\lambda y\lambda d\lambda$$
$$\text{and}$$
$$Z = \int P\lambda z\lambda d\lambda$$

as defined hereinbefore.

The function $X+Y+Z$ is calculated, from which the required functions $$x = \frac{X}{X+Y+Z}$$

and $$y = \frac{Y}{X+Y+Z}$$

can easily be derived in suitable analogue circuitry. The point x, y on the Chromaticity Diagram is thereby established to provide a numerical representation of the incident color.

In essence, the aforegoing arrangement can be regarded as performing an analogue integration of the three color matching functions $x\lambda$, $y\lambda$, $z\lambda$. Since such a detector measures "real" color, it can therefore be used to monitor color changes in a light beam, due to modulation arising from displacement sensors of the type described above.

The time response of the aforegoing detector is of the order of a few $\lambda$s or better. It can be made for very little cost in terms of hardware and is very compact. The required mathematical computations are minimal and a microprocessor is optional but not essential.

It will be noted that such detectors can cope simutaneously with the processing of more than one signal input, i.e. color changes resulting from variations in more than one parameter to be measured. Such a detector could therefore be used, for instance, to provide automatic temperature compensation in a displacement transducer by making, for example, the "white-emerald" parameter temperature-sensitive.

The above-described detector using tri-element detection to simulate the three detectors employed in the conventional analysis of color has the advantage that not only may intensity changes due to increased system attenuation be eliminated but also changes in the spectral signature due to system ageing, rather than sensor modulation, may be identified. This is illustrated again in FIG. 25 which is a simplified version of FIG. 19. The line A—A corresponds to a colour change due to modulation whereas the line B—B corresponds to colour changes which are system-induced. In this case, the locus of the output of the detectors occurs in two dimensions.

Tri-element detection is, however, not essential and a detector having merely two photo-responsive elements is possible, as illustrated in FIGS. 26, 27 and 28. In FIG. 26, light from an optical fibre 100 is applied to two coloured spheres 101, 102, each of which is located in front of a respective light responsive element 103, 104, for example photo-sensitive diodes. The responsivity with respect to wavelength of the first element 103 is arranged to be different to that of the second element 104. From the signals from the two elements 103, 104, the spectral distribution of the radiation incident on the detector can be calculated in terms of two parameters on the Chromaticity (C.I.E.) Diagram. The parameters can then be interpreted to determine the displacement of the object in question.

This is illustrated in FIGS. 27 and 28. FIG. 28 shows examples of the response curves $\eta_1(\lambda)$ and $\eta_2(\lambda)$ of the first and second light responsive elements 103, 104 and the signal amplitude $I(\lambda)$.

$$O_1 = \text{output of element 103} = \int_{\lambda_a}^{\lambda_b} I(\lambda)\, \eta_1(\lambda) d$$

$$O_2 = \text{output of element 104} = \int_{\lambda_a}^{\lambda_b} I(\lambda)\, \eta_2(\lambda) d$$

Arithmetic elements 105, 106 then provide:

$$\text{Signal output 105} = \frac{O_1}{O_1 + O_2} = \text{co-ordinate } x$$

$$\text{Signal output 106} = \frac{O_2}{O_1 + O_2} = \text{co-ordinate } y$$

FIG. 27 is equivalent to the diagram of FIG. 25 when only two-element detection is made. The line C—C corresponds to a color change due to modulation, i.e. the dominant colour in the detected signal lies on this line, the locus of which is $x + y = 1$. Thus, by detecting the shift in output signal along the line C—C, a measurement of the shift of the dominant wavelength is made which, by calibration, gives the required measurement of the distance by which the modulating element, and hence the object, has moved.

Another embodiment of the multiple detector system involves sequential rather than parallel sampling of the signal (as shown on FIG. 26). A practical form involves the so-called "color diode" whose output signal is processed by newly developed electron circuitry to provide extremely high sensitivity and long term stability.

A still further possibility lies in the use of a Fourier Transformer Spectrometer to perform the detection and measurement of the displacement of the modulating element. This is illustrated in FIG. 29 which illustrates highly diagrammatically a detection system wherein light from a source T, modulated in a sensor S (which can include any of the modulating elements described above), is passed to an interferometer having an oscillating mirror $M_1$ but only a single detector D. The resulting spectral signal is transformed into a time variation signature for subsequent processing and quantification.

It will be appreciated from the foregoing description that the present invention may be applied to a wide variety of applications where measurement of displacement can be used directly or be converted to provide measurement of another parameter. Examples therefore lie in the measurement of pure displacement, pressure, temperature, current, voltage, mass flow, liquid depth etc.

As well as the advantages already enumerated, the present invention provides a number of attractive possibilities.

(1) A common system can be used for all measurements such as those listed above. It is only necessary to change the nature of the membrane to which the sensor is attached in order to change the parameter to be measured. A large number of parameters can be monitored simultaneously.

(2) For systems in which spectral information from a naturally occurring light source is required anyway, the transmission and processing system will already be in existence. Information from the chromatic modulators can, in principle, be transmitted and processed by this existing system. Examples where such systems are attractive include plasma processing, combustion (both industrial scale and internal combustion engines), and power switchgear.

(3) The color measurement system as opposed to the wavelength ratio system utilises the radiant signal power more efficiently, so improving sensitivity, accuracy and fibre transmission lengths significantly and making industrial application involving long distances (many Km) viable.

We claim:

1. An apparatus for determining displacement of an object, comprising:
    a detector which detects the intensity of incident radiation at a plurality of different wavelengths,
    a light source which propagates a polychromatic light beam along a path to said detector,
    a radiation modulation means mechanically coupled to said object for movement therewith so that displacement of the object causes displacement of the radiation modulating means in said path such as to vary the distributed spectral content of the light reaching the detector,
    a radiation modulation means comprising a filter which attenuates the intensity of transmitted wavelengths to different degrees dependent upon its position in relation to said path of the polychromatic light signal,
    said filter being in the form of a colored transparent sphere having a cross-sectional configuration forming a convergent lens which provides a focusing action on said polychromatic light beam when it passes through said filter.

2. An apparatus according to claim 1, including a plurality of said colored, transparent spheres of different spectral properties adapted to be moved in a corresponding plurality of different directions in said path in accordance with a respective plurality of displacements to be determined.

3. An apparatus according claim 1, wherein the filter comprises a plurality of colored, transparent spheres disposed in an elongate array.

4. An apparatus according to claim 3, wherein the plurality of spheres are positioned in a straight row, with the peripheral surfaces of adjacent spheres in the row in point engagment one with the next, such that displacement of said object causes longitudinal displacement of the whole row of spheres relative to said path.

5. An apparatus according to claim 3, wherein, for detecting angular displacement of a rotatable body, the plurality of spheres are disposed around a circular path whose center lies on the axis of rotation of the body, with the peripheral surfaces of adjacent spheres being in point engagement one with the next.

6. An apparatus for determining displacement of an object, comprising:
- a detector which detects the intensity of incident radiation at a plurality of different wavelengths,
- a light source which propagates a polychromatic light beam along a path to said detector,
- a radiation modulation means mechanically coupled to said object for movement therewith so that displacement of the object causes displacement of the radiation modulating means in said path such as to vary the distributed spectral content of the light reaching the detector,
- the radiation modulation means comprising a filter which attenuates the intensity of transmitted wavelengths to different degrees dependent upon its position in relation to said path of the polychromatic light signal,
- said filter being in the form of a plurality of colored, transparent spheres disposed in an elongate array which provide not only modulation of said radiation but also a focusing action on said polychromatic light beam when it passes through said filter.

7. An apparatus according to claim 6, wherein the plurality of spheres are positioned in a straight row, with the peripheral surfaces of adjacent spheres in the row in point engagment one with the next, such that displacement of said object causes longitudinal displacement of the whole row of spheres relative to said path.

8. An apparatus according to claim 6, wherein, for detecting angular displacement of a rotatable body, the plurality spheres are disposed around a circular path whose center lies on the axis of rotation of the body, with the peripheral surfaces of adjacent spheres being in point engagment one with the next.

9. An apparatus according to claim 6, including a plurality of colored, transparent spheres of different spectral properties adapted to be moved in a corresponding plurality of different directions in said path in accordance with a respective plurality of displacements to be determined.

* * * * *